(12) United States Patent
Sakamoto et al.

(10) Patent No.: US 11,084,995 B2
(45) Date of Patent: Aug. 10, 2021

(54) CARBONACEOUS FEEDSTOCK GASIFICATION POWER GENERATION FACILITY, AND METHOD FOR REGULATING DRYING GAS CARBONACEOUS FEEDSTOCK

(71) Applicant: Mitsubishi Hitachi Power Systems, Ltd., Yokohama (JP)

(72) Inventors: Koichi Sakamoto, Yokohama (JP); Hiromi Ishii, Yokohama (JP); Takashi Fujii, Yokohama (JP); Shogo Yoshida, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 289 days.

(21) Appl. No.: 16/097,903

(22) PCT Filed: May 10, 2017

(86) PCT No.: PCT/JP2017/017738
§ 371 (c)(1),
(2) Date: Oct. 31, 2018

(87) PCT Pub. No.: WO2017/199818
PCT Pub. Date: Nov. 23, 2017

(65) Prior Publication Data
US 2019/0144769 A1  May 16, 2019

(30) Foreign Application Priority Data

May 20, 2016 (JP) .............................. JP2016-101746

(51) Int. Cl.
*C10J 3/48* (2006.01)
*F02C 3/28* (2006.01)
(Continued)

(52) U.S. Cl.
CPC .............. *C10J 3/485* (2013.01); *B01D 53/56* (2013.01); *C10J 3/46* (2013.01); *C10J 3/506* (2013.01);
(Continued)

(58) Field of Classification Search
CPC ....................................................... C10J 3/485
(Continued)

(56) References Cited

U.S. PATENT DOCUMENTS 4,689,949 A    9/1987  Kashiwazaki et al.
5,855,111 A *  1/1999  Oguchi .............. B01D 53/8625
                                                    60/39.24
(Continued)

FOREIGN PATENT DOCUMENTS

JP          1-41815 B2    9/1989
JP       2010-106722 A    5/2010
JP       2013-170463 A    9/2013

*Primary Examiner* — Douglas B Call
(74) *Attorney, Agent, or Firm* — Westerman, Hattori, Daniels & Adrian, LLP (57) ABSTRACT

A carbonaceous feedstock gasification power generation facility, and a method for regulating a gas for drying gas this carbonaceous feedstock, are disclosed with which it is possible to expand the range of the types of carbonaceous feedstocks that can be used. High-temperature exhaust gas, low-temperature exhaust gas and extreme high-temperature exhaust gas are bled from the furnace respectively at a high-temperature bleed position, a low-temperature bleed position and an extreme high-temperature bleed position. When these exhaust gases are mixed, the flow volume of the extreme high-temperature exhaust gas supplied to at least one of the exhaust gases, that is, the high-temperature exhaust gas or the low-temperature exhaust gas, is adjusted such that the temperature of at least one of these exhaust gases, that is, the high-temperature exhaust gas or the
(Continued)

low-temperature exhaust gas, reaches a prescribed temperature.

10 Claims, 6 Drawing Sheets (51) Int. Cl.
*F02C 6/18* (2006.01)
*F23K 1/04* (2006.01)
*B01D 53/56* (2006.01)
*F02C 9/28* (2006.01)
*C10J 3/86* (2006.01)
*F23G 5/027* (2006.01)
*C10J 3/46* (2006.01)
*C10J 3/50* (2006.01)
*F23B 90/06* (2011.01)
*B01D 53/86* (2006.01)

(52) U.S. Cl.
CPC ................................ *C10J 3/86* (2013.01);
*F02C 3/28* (2013.01); *F02C 6/18* (2013.01);
*F02C 9/28* (2013.01); *F23B 90/06* (2013.01);
*F23G 5/027* (2013.01); *F23K 1/04* (2013.01);
*B01D 53/8625* (2013.01); *B01D 2251/206*
(2013.01); *B01D 2257/402* (2013.01); *B01D 2257/404* (2013.01); *C10J 2200/156*
(2013.01); *C10J 2300/093* (2013.01); *C10J 2300/0906* (2013.01); *C10J 2300/0909*
(2013.01); *C10J 2300/0959* (2013.01); *C10J 2300/165* (2013.01); *C10J 2300/1609*
(2013.01); *C10J 2300/1653* (2013.01); *C10J 2300/1675* (2013.01); *C10J 2300/1678*
(2013.01); *C10J 2300/1687* (2013.01); *C10J 2300/1884* (2013.01); *C10J 2300/1892*
(2013.01); *F23G 2206/10* (2013.01); *Y02E 20/18* (2013.01)

(58) Field of Classification Search
USPC .......................................................... 252/373
See application file for complete search history.

(56) References Cited

U.S. PATENT DOCUMENTS

| | | | |
|---|---|---|---|
| 2005/0112042 A1* | 5/2005 | Honjo | C10J 3/485 423/210 |
| 2011/0308230 A1 | 12/2011 | Takase et al. | |
| 2013/0298465 A1* | 11/2013 | Kizu | C10J 3/50 48/101 |
| 2015/0353850 A1* | 12/2015 | Ohara | C10J 3/84 422/111 |

* cited by examiner

CARBONACEOUS FEEDSTOCK GASIFICATION POWER GENERATION FACILITY, AND METHOD FOR REGULATING DRYING GAS CARBONACEOUS FEEDSTOCK

TECHNICAL FIELD

The present invention relates to a carbonaceous feedstock gasification power generation facility which bleeds a flue gas from a heat recovery steam generator and dries a carbonaceous feedstock using this bled flue gas as a drying gas and a method for adjusting a drying gas the carbonaceous feedstock.

BACKGROUND ART

In the related art, as a high-efficiency power generation facility, an integrated coal gasification combined cycle (hereinafter, referred to as the "IGCC system") is known.

In the IGCC system, power is generated by operating a gas turbine using a raw syngas generated by the gasification of coal as a fuel, and, furthermore, power is generated by driving a steam turbine using steam generated using an exhaust heat from the gas turbine. Specifically, pulverized coal is manufactured by drying and pulverizing coal using a coal pulverizer, and this pulverized coal is supplied into a gasifier and gasified. In addition, the gas turbine is operated using a raw syngas generated by the gasification as a fuel, and power is generated by driving a generator connected to this gas turbine using the gas turbine. In addition, steam is generated by introducing a flue gas being discharged from the gas turbine into the heat recovery steam generator, and the steam turbine and, furthermore, the generator connected to the steam turbine are driven with this steam, thereby generating power.

In the IGCC system, a part of the flue gas from the gas turbine is drawn and supplied to the coal pulverizer, and this flue gas is used as a drying gas coal (hereinafter, referred to as the "drying gas"), thereby increasing the power generation efficiency by effectively using heat in a cycle.

As a technique for using the above-described flue gas from the gas turbine as the drying gas, there is, for example, a technique disclosed in PTL 1. Hereinafter, the technique disclosed in PTL 1 will be described, and, in the description, reference signs that are used in PTL 1 are indicated in parentheses for reference.

PTL 1 (refer to rows 5 to 13 in the fourth column on page 2, FIG. 1, and the like) discloses "a technique in which parts of a combustion flue gas are respectively drawn from an upstream side and a downstream side of a flue gas boiler (29) and mixed together and this mixed combustion flue gas is supplied to a coal pulverizer (12) as a heat source for drying pulverized coal".

CITATION LIST

Patent Literature

[PTL 1] Japanese Examined Patent Application Publication No. 1-41815

SUMMARY OF INVENTION

Technical Problem

In an ordinary IGCC system of the related art, a denitration device (in-furnace denitration device) is disposed in a heat recovery steam generator, a part of a flue gas from an outlet of the denitration device in the heat recovery steam generator and a part of a flue gas from an outlet of the heat recovery steam generator are respectively bled, these bled flue gases are mixed together and supplied to a coal pulverizer as a drying gas coal, and the drying gas being discharged from the coal pulverizer is discharged to the atmosphere.

With the above-described constitution, the relatively high-temperature flue gas from the outlet of the denitration device and the relatively low-temperature flue gas from the outlet of the heat recovery steam generator are mixed together, whereby the drying gas is adjusted to a desired temperature, and both the flue gas from the outlet of the denitration device and the flue gas from the outlet of the heat recovery steam generator are treated using the denitration device, thereby setting the NOx concentration of the drying gas being discharged to the atmosphere to a regulation value or less.

Meanwhile, the denitration efficiency of the denitration device is maximized when the operation temperature is a prescribed temperature (for example, approximately 350° C.) (hereinafter, this prescribed temperature will be referred to as the "maximum efficiency temperature"), and the heat recovery steam generator is operated so that the operation temperature of the denitration device reaches the maximum efficiency temperature (or near the maximum efficiency temperature). Therefore, in the above-described technique, the temperatures of the respective flue gases from the outlet of the denitration device and the outlet of a flue gas boiler and, furthermore, the temperature of the drying gas obtained by mixing the respective flue gases are provided with an upper limit depending on the maximum efficiency temperature of the denitration device.

When the drying of the coal (the pulverized coal) is insufficient, dew condensation and agglomeration are caused in a pipe that transports the coal, and thus there is a possibility of deteriorating the transportation characteristic of the coal, and the amount of heat input to a gasifier is used to evaporate moisture, which degrades the gasification efficiency. As the coal includes a larger amount of moisture, a larger amount of heat is required to sufficiently dry the coal; however, in an ordinary IGCC system of the related art, as described above, the upper limit of the temperature of the drying gas is dependent on the maximum efficiency temperature of the denitration device, and thus there is a possibility that high-moisture coal may not be sufficiently dried. Therefore, there has been a problem in that the kinds of available coal are limited.

The above-described problem is a common problem of not only the integrated coal gasification combined cycle but also a carbonaceous feedstock gasification power generation facility that generates power by gasifying a carbonaceous feedstock including a large amount of moisture (for example, biomass).

The present invention has been made in consideration of the above-described problem, and an object of the present invention is to provide a carbonaceous feedstock gasification power generation facility enabling the expansion of the range of the kinds of carbonaceous feedstocks that can be used as fuels and a method for adjusting a drying gas the carbonaceous feedstock.

Solution to Problem (1) In order to achieve the above-described object, a carbonaceous feedstock gasification power generation facility of the present invention includes a pulverizing device that pulverizes a carbonaceous feedstock to produce a pulverized fuel, a gasifier that gasifies the pulverized fuel to generate a raw syngas, a gas turbine that is driven by a combustion gas obtained by combusting the raw syngas, a generator that is connected to the gas turbine and driven by the gas turbine, a heat recovery steam generator that introduces a flue gas being discharged from the gas turbine, is provided with an upstream-side heat exchange portion made up of one or more heat exchangers, an in-furnace denitration device, and a downstream-side heat exchange portion made up of one or more heat exchangers in a furnace in this order from a flue gas upstream side, and generates a steam by recovering heat from the flue gas in the upstream-side heat exchange portion and the downstream-side heat exchange portion, a high-temperature flue gas line that bleeds a high-temperature flue gas from the furnace at a high-temperature bleed position which is set on a flue gas downstream side of the in-furnace denitration device and supplies the high-temperature flue gas to the pulverizing device as a drying gas the carbonaceous feedstock, a low-temperature flue gas line that bleeds a low-temperature flue gas from the furnace at a low-temperature bleed position which is set on the flue gas downstream side of the high-temperature bleed position and set so as to sandwich at least a part of the downstream-side heat exchange portion between the high-temperature bleed position and the low-temperature bleed position and supplies the low-temperature flue gas to the high-temperature flue gas line or directly to the pulverizing device, an extreme high-temperature flue gas line that bleeds an extreme high-temperature flue gas from the furnace at an extreme high-temperature bleed position which is set on a flue gas upstream side of the high-temperature bleed position between a flue gas outlet of the gas turbine and the in-furnace denitration device and set so as to sandwich at least a part of the upstream-side heat exchange portion between the high-temperature bleed position and the extreme high-temperature bleed position and supplies the extreme high-temperature flue gas to at least one flue gas line of the high-temperature flue gas line and the low-temperature flue gas line, and temperature adjustment means that is interposed in the extreme high-temperature flue gas line and adjusts a flow rate of the extreme high-temperature flue gas being supplied to the at least one flue gas line so that a gas temperature in the at least one flue gas line reaches a prescribed temperature.

(2) The carbonaceous feedstock gasification power generation facility preferably includes a drying gas discharging line that discharges the drying gas used to dry the carbonaceous feedstock from the pulverizing device, nitrogen oxide concentration detection means that detects a nitrogen oxide concentration of the drying gas in the drying gas discharging line, and reducing agent supply amount adjustment means that adjusts a supply amount of a reducing agent being supplied to the in-furnace denitration device according to a detection signal from the nitrogen oxide concentration detection means.

(3) It is preferable that the carbonaceous feedstock gasification power generation facility includes a drying gas discharging line that discharges the drying gas used to dry the carbonaceous feedstock from the pulverizing device, and the drying gas discharging line is connected to the furnace on the flue gas upstream side of the in-furnace denitration device in a communicated state.

(4) It is preferable that the carbonaceous feedstock gasification power generation facility includes temperature detection means in the drying gas discharging line, and, in a case in which a temperature of the drying gas detected using the temperature detection means is lower than a reference temperature set on the basis of a maximum efficiency temperature of the in-furnace denitration device, an opening degree of at least one of a water supply valve that controls an amount of water being supplied to the heat recovery steam generator and a steam valve that controls an amount of a steam from the heat recovery steam generator is decreased.

(5) The carbonaceous feedstock gasification power generation facility preferably includes an external denitration device in the extreme high-temperature flue gas line.

(6) In order to achieve the above-described object, a method for adjusting a drying gas a carbonaceous feedstock of the present invention is a method for adjusting a drying gas being used to dry a carbonaceous feedstock in a carbonaceous feedstock gasification power generation facility including a gasifier that gasifies a carbonaceous feedstock to generate a raw syngas, a gas turbine that is driven by a gas for combustion obtained by combusting the raw syngas, a generator that is connected to the gas turbine and driven by the gas turbine, and a heat recovery steam generator that generates a steam by recovering heat from a flue gas in being discharged from the gas turbine, in which the heat recovery steam generator is provided with an upstream-side heat exchange portion made up of one or more heat exchangers, an in-furnace denitration device, and a downstream-side heat exchange portion made up of one or more heat exchangers in a furnace in this order from an upstream side in a circulation direction of the flue gas, the method including: a high-temperature flue gas bleeding step of bleeding a high-temperature flue gas from the furnace at a high-temperature bleed position which is set on a downstream side of the in-furnace denitration device in the circulation direction, a low-temperature flue gas bleeding step of bleeding a low-temperature flue gas from the furnace at a low-temperature bleed position which is set on the downstream side of the in-furnace denitration device and the high-temperature bleed position in the circulation direction and set so as to sandwich at least a part of the downstream-side heat exchange portion between the high-temperature bleed position and the low-temperature bleed position, an extreme high-temperature flue gas bleeding step of bleeding an extreme high-temperature flue gas from the furnace at an extreme high-temperature bleed position which is set on a flue gas upstream side of the high-temperature bleed position between an outlet of the flue gas from the gas turbine and the in-furnace denitration device and set so as to sandwich at least a part of the upstream-side heat exchange portion between the high-temperature bleed position and the extreme high-temperature bleed position, and a mixing step of mixing the low-temperature flue gas and the extreme high-temperature flue gas into the high-temperature flue gas, in which, in the mixing step, a flow rate of the extreme high-temperature flue gas being supplied to at least one flue gas is adjusted so that a gas temperature in the at least one flue gas of the high-temperature flue gas and the low-temperature flue gas reaches a prescribed temperature.

(7) The method for adjusting a drying gas a carbonaceous feedstock preferably includes a reducing agent supply amount adjustment step of adjusting an amount of a reducing agent being supplied to the in-furnace denitration device according to a nitrogen oxide concentration of the drying gas used to dry the carbonaceous feedstock.

(8) The method for adjusting a drying gas a carbonaceous feedstock preferably includes a drying gas recirculation step of returning the drying gas used to dry the carbonaceous feedstock to the furnace on the flue gas upstream side of the in-furnace denitration device.

(9) In a case in which a temperature of the drying gas used to dry the carbonaceous feedstock is lower than a reference temperature set on the basis of a maximum efficiency temperature of the in-furnace denitration device, at least any one of an amount of water being supplied to the heat recovery steam generator and an amount of a steam from the heat recovery steam generator is preferably decreased.

(10) The method for adjusting a drying gas a carbonaceous feedstock preferably includes an extreme high-temperature flue gas denitration step of denitration-treating the extreme high-temperature flue gas.

Advantageous Effects of Invention

According to the present invention, it is possible to increase the temperature of a drying gas for drying a carbonaceous feedstock in a pulverizing device by adjusting the temperature of the drying gas using an extreme high-temperature flue gas bled on an upstream side of an in-furnace denitration device in addition to a low-temperature flue gas and a high-temperature flue gas bled respectively on a flue gas downstream side of the in-furnace denitration device. Therefore, it is possible to sufficiently dry a carbonaceous feedstock including a large amount of moisture, and it is possible to expand the range of the kinds of carbonaceous feedstocks that can be used as fuels for carbonaceous feedstock gasification power generation facilities.

DESCRIPTION OF EMBODIMENTS

Hereinafter, embodiments of the present invention will be described with reference to drawings.

In the present embodiments, an example in which a carbonaceous feedstock gasification power generation facility of the present invention is applied to an integrated coal gasification combined cycle will be described.

Meanwhile, embodiments described below are simply examples and do not intend to exclude the application of a variety of modifications or techniques that are not clearly specified in the following embodiments. Individual configurations of the following embodiments can be modified in various manner and carried out within the scope of the gist thereof, can be selected as necessary, or can be appropriately combined together.

In addition, in the following description, "being upstream" and "being downstream" refers to being upstream or downstream in a circulation direction of a flue gas from a gas turbine unless particularly otherwise described.

1. First Embodiment

[1-1. Overall Configuration of Integrated Coal Gasification Combined Cycle]

The overall configuration of an integrated coal gasification combined cycle according to a first embodiment of the present invention will be described with reference to FIG. 1.

An integrated coal gasification combined cycle according to the first embodiment of the present invention illustrated in FIG. 1 (carbonaceous feedstock gasification power generation facility; hereinafter, also referred to as the "IGCC system") 100 employs an air combustion mode in which a raw syngas 21 is generated in a gasifier 4 using mainly the air as an oxygen containing gas and supplies a raw syngas 24 that has been purified using a gas purification device 7 to a gas turbine 8 as a gas turbine fuel. That is, the IGCC system 100 illustrated in FIG. 1 is an air combustion-mode (air blowing) integrated coal gasification combined cycle.

Figure 1:
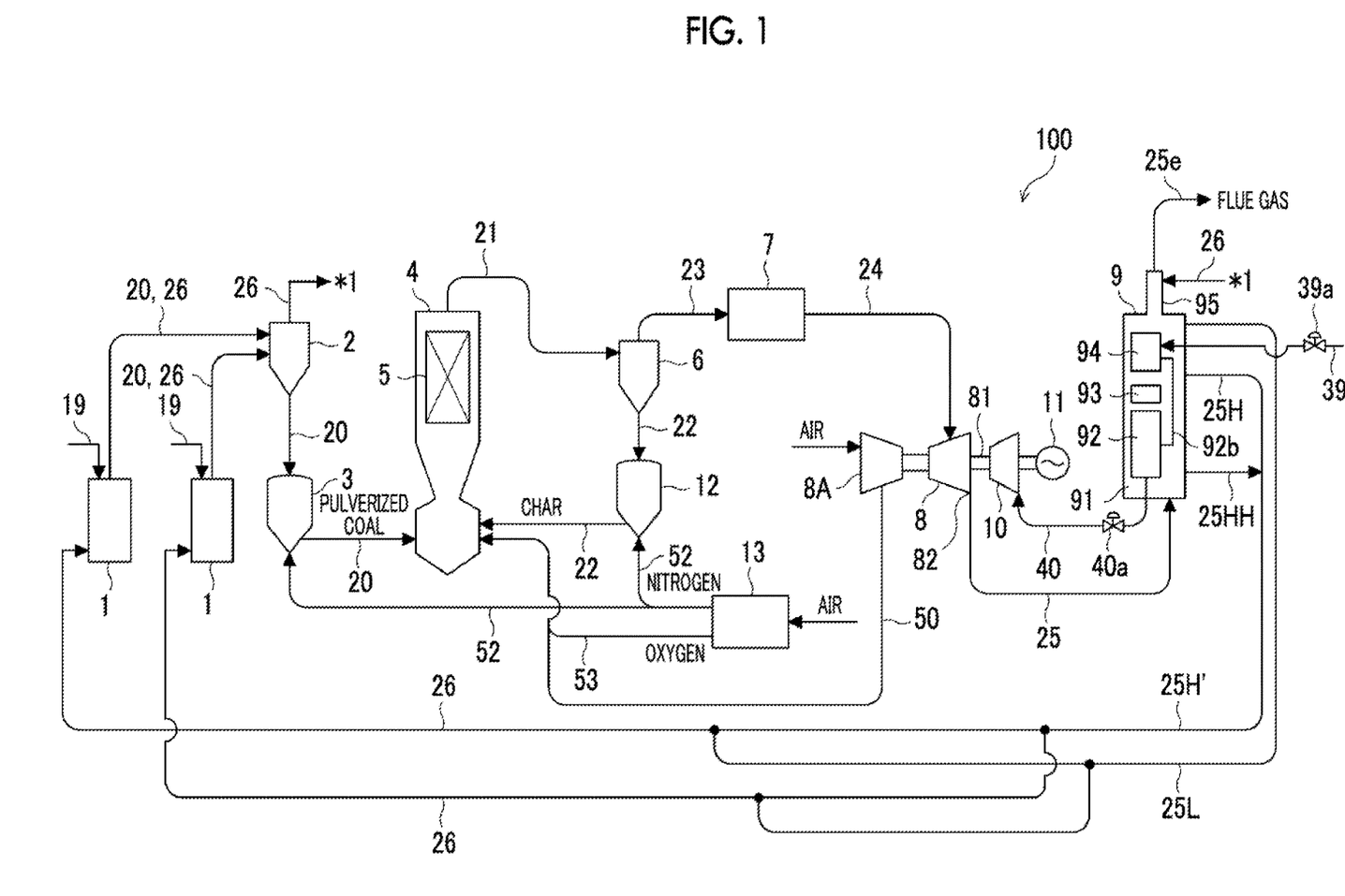
FIG. 1 is a schematic view illustrating an overall configuration of an integrated coal gasification combined cycle according to each embodiment of the present invention.

Specifically, the IGCC system 100 is configured by including coal pulverizers (pulverizing devices) 1 and 1, a dust collector 2, a hopper 3, the gasifier 4, a gas cooler 5, a char recovery device 6, the gas purification device 7, the gas turbine 8, a heat recovery steam generator (hereinafter, also referred to as "HRSG") 9, a steam turbine 10, a generator 11, a hopper 12, and an air separation device 13 as illustrated in FIG. 1.

In this IGCC system 100, a part of a flue gas supplied to HRSG 9 from the gas turbine 8 is bled and supplied to the coal pulverizers 1 as a drying gas 26 (a drying gas system will be described below in detail). In the coal pulverizer 1, a coal (carbonaceous feedstock) 19 which serves as a raw material of the raw syngas 24 is pulverized to a fine particle shape while being heated and dried using the drying gas 26, thereby manufacturing a pulverized coal (pulverized fuel) 20.

The pulverized coal 20 manufactured in the above-described manner is transported to the dust collector 2 using the drying gas 26. In the dust collector 2, the drying gas 26 and the pulverized coal 20 are separated from each other, and the drying gas 26 is sent to a stack 95 of HRSG 9, mixed with a flue gas heat-recovered in HRSG 9, and discharged to the atmosphere from the stack 95 as a flue gas 25e. Meanwhile, the pulverized coal 20 separated from the drying gas 26 drops by gravity and is recovered in the hopper 3.

The pulverized coal 20 recovered in the hopper 3 is transported into the gasifier 4 using a nitrogen gas (gas for transportation) 52 introduced from the air separation device 13 described below for pressurization transportation.

To the gasifier 4, the pulverized coal 20 and a char 22 described below are supplied as raw materials of the raw syngas 24. In the gasifier 4, the pulverized coal 20 and the char 22 are gasified using a compressed air 50 being supplied from a compressor 8A that is driven by the gas turbine 8 and oxygen 53 being supplied from the air separation device 13 as oxygen containing gases, thereby manufacturing the raw syngas 21.

The raw syngas 21 generated in the gasifier 4 is cooled using the gas cooler 5 installed in the gasifier 4 and then supplied to a char recovery device 6 from an upper portion of the gasifier 4.

The raw syngas 21 contains the char 22, and the char 22 is separated from the raw syngas 21 in the char recovery device 6. A raw syngas 23 from which the char 22 has been separated is supplied to the gas purification device 7 from an upper portion of the char recovery device 6, purified using this gas purification device 7, and then supplied to the gas turbine 8 as the gas-phase raw syngas 24. On the other hand, the char 22 recovered in the char recovery device 6 drops into the hopper 12 by gravity and is recovered. The char 22 in the hopper 12 is returned to the gasifier 4 using the nitrogen gas 52 being supplied from the air separation device 13 and used as a raw material of the raw syngas 21 together with the pulverized coal 20.

The raw syngas 24 supplied to the gas turbine 8 is supplied to a combustor (not illustrated) of the gas turbine 8 and combusted, thereby generating a combustion flue gas. This combustion flue gas drives the gas turbine 8 and is then discharged from a flue gas outlet 82 as a flue gas 25. The gas turbine 8 driven in the above-described manner has a main shaft 81 connected to the generator 11 and is thus capable of generating power by driving the generator 11.

The flue gas 25 discharged from the gas turbine 8 is supplied to HRSG 9. In a furnace 91 of HRSG 9, a heat exchange portion made up of a plurality of heat exchangers (hereinafter, also referred to as the "upstream-side heat exchange portion") 92, an in-furnace denitration device 93, and a heat exchange portion made up of a plurality of heat exchangers (hereinafter, also referred to as the "downstream-side heat exchange portion") 94 are provided in this order from the upstream side. These heat exchange portions 92 and 94 are connected to each other through a connection pipe 92b.

To the heat exchange portion 94, a water supply 39 having a flow rate controlled by the opening degree control of a water supply valve 39a is supplied. This water supply is heated through the heat exchange with the flue gas 25 and turns into a steam 40 in a process of circulating the water supply in the heat exchange portions 92 and 94. This steam 40 is supplied to the steam turbine 10 after the flow rate is controlled by the opening degree control of a steam valve 40a. The steam turbine 10 is concentrically connected to the gas turbine 8 and the generator 11 and drives the generator 11 together with the gas turbine 8, thereby generating power.

The in-furnace denitration device 93 is a device for reducing NOx (nitrogen oxide) in the flue gas 25 in the furnace 91, and NOx included in the flue gas 25 is decomposed using ammonia as a reducing agent and a catalyst, thereby being detoxified. The flue gas 25 purified using the in-furnace denitration device 93 is discharged to the atmosphere from the stack 95 together with the drying gas 26 as described above.

[1-2. Drying gas System (Main Part Configuration)]

The drying gas system which is a main part of the present invention will be described together with the configuration of HRSG 9 with reference to FIG. 2.

Figure 2:
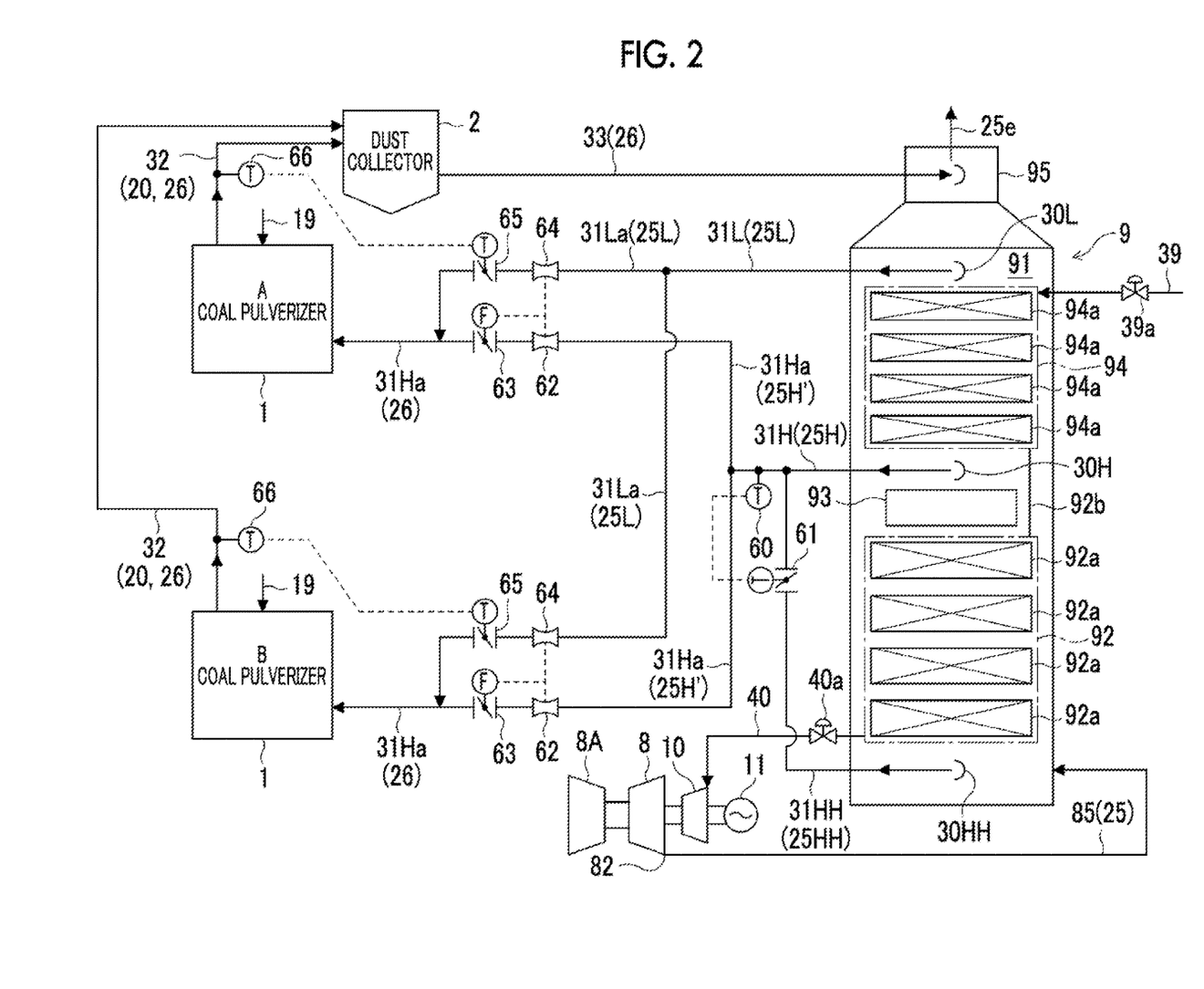
FIG. 2 is a schematic view illustrating a drying gas system of a coal (pulverized coal) according to a first embodiment of the present invention.

In HRSG 9, as illustrated in FIG. 2, the furnace 91 includes the upstream-side heat exchange portion 92 located on the upstream side of the in-furnace denitration device 93 and the downstream-side heat exchange portion 94 located on the downstream side of the in-furnace denitration device 93. In the present embodiment, the upstream-side heat exchange portion 92 is configured as a heat exchanger group made up of four heat exchangers 92a, and the downstream-side heat exchange portion 94 is configured as a heat exchanger group made up of four heat exchangers 94a. Hereinafter, the upstream-side heat exchange portion 92 will be referred to as the "upstream-side heat exchanger group 92" or the "heat exchanger group 92", and the downstream-side heat exchange portion 94 will be referred to as the "downstream-side heat exchanger group 94" or the "heat exchanger group 94".

The upstream-side heat exchanger 92a is, for example, an evaporator, a repeater, or a superheater. The downstream-side heat exchanger 94a is, for example, an economizer or an evaporator.

As described above, a part of the flue gas 25 supplied to the furnace 91 of HRSG 9 is bled and used as the drying gas 26 of coal. In addition, this drying gas 26 is adjusted by mixing flue gases 25L, 25H, and 25HH.

The flue gas 25H is bled from a bleed position (high-temperature bleed position) 30H which is set on the downstream side of the heat exchanger group 92 or the in-furnace denitration device 93. In the present embodiment, this bleed position 30H is set on the upstream side of the heat exchanger group 94. Therefore, the flue gas 25H being bled from the bleed position 30H is a high-temperature flue gas which has been denitration-treated using the in-furnace denitration device 93 and heat-recovered using the heat exchanger group 92, but is not yet heat-recovered using the heat exchanger group 94. Hereinafter, the flue gas 25H will also be referred to as the "high-temperature flue gas 25H".

The flue gas 25L is bled from a bleed position (low-temperature bleed position) 30L which is set on the downstream side of the heat exchanger group 92 or the in-furnace denitration device 93. In the present embodiment, this bleed position 30L is set on the downstream side of the heat exchanger group 94. Therefore, the flue gas 25L being bled from the bleed position 30L is a low-temperature flue gas which has been denitration-treated using the in-furnace denitration device 93 and heat-recovered using the heat exchanger groups 92 and 94. Hereinafter, the flue gas 25L will also be referred to as the "low-temperature flue gas 25L".

The flue gas 25HH is bled from a bleed position (extreme high-temperature bleed position) 30HH which is set on the upstream side of the in-furnace denitration device 93. In the present embodiment, this bleed position 30HH is set on the upstream side of the heat exchanger group 92. Therefore, the flue gas 25HH being bled from the bleed position 30HH is a high-temperature flue gas which has been denitration-treated using the in-furnace denitration device 93, but is not yet heat-recovered using the heat exchanger groups 92 and 94 and has a higher temperature than the high-temperature flue gas 25H. Hereinafter, the flue gas 25HH will also be referred to as the "extreme high-temperature flue gas 25HH".

The furnace 91 is connected to a high-temperature flue gas duct (high-temperature flue gas line) 31H provided outside the furnace in a communicated state at the bleed position 30H. This high-temperature flue gas duct 31H is branched into high-temperature flue gas ducts (high-temperature flue gas lines) 31Ha and 31Ha, and the respective high-temperature flue gas ducts 31Ha are respectively connected to the coal pulverizers 1. Therefore, the high-temperature flue gas 25H is adjusted to a prescribed temperature by mixing the extreme high-temperature flue gas 25HH and the low-temperature flue gas 25L into the high-temperature flue gas as described below and then supplied to the coal pulverizers 1 and 1 as the drying gas 26 of the coal 19 (pulverized coal 20).

In addition, the furnace 91 is connected to a low-temperature flue gas duct (low-temperature flue gas line) 31L provided outside the furnace in a communicated state at the bleed position 30L. This low-temperature flue gas duct 31L is branched into low-temperature flue gas ducts (low-temperature flue gas lines) 31La and 31La, and the respective low-temperature flue gas ducts 31La are respectively connected to the high-temperature flue gas ducts 31Ha. Therefore, the low-temperature flue gas 25L is supplied to the high-temperature flue gas ducts 31Ha and 31Ha as a gas for temperature adjustment for decreasing the temperature of the high-temperature flue gas 25H.

In addition, the furnace 91 is connected to an extreme high-temperature flue gas duct (extreme high-temperature flue gas line) 31HH provided outside the furnace in a communicated state at the bleed position 30HH. This extreme high-temperature flue gas duct 31HH is connected to the high-temperature flue gas duct 31H. Therefore, the extreme high-temperature flue gas 25HH is supplied to the high-temperature flue gas duct 31H as a gas for temperature adjustment for increasing the temperature of the high-temperature flue gas 25H, and the temperature-increased high-temperature flue gas 25H is adjusted.

In addition, in the high-temperature flue gas duct 31H, a temperature sensor 60 that detects the temperature of a high-temperature flue gas 25H' is provided on the downstream side of a connection portion with the extreme high-temperature flue gas duct 31HH.

In addition, in the extreme high-temperature flue gas duct 31HH, a temperature adjustment damper (temperature adjustment means) 61 is interposed. A detection signal from the temperature sensor 60 is output to the temperature adjustment damper 61, and the temperature adjustment damper 61 changes the damper opening degree on the basis of the detection signal from the temperature sensor 60. Therefore, the flow rate of the extreme high-temperature flue gas 25HH being mixed into the high-temperature flue gas 25H is adjusted using the temperature adjustment damper 61 so that the high-temperature flue gas 25H' is increased up to a prescribed set temperature.

The set temperature being adjusted using the temperature adjustment damper 61 is set depending on GID of a load on the gasifier 4 (hereinafter, referred to as the gasifier load) on the basis of a set function illustrated in FIG. 3. This set function is stored in the temperature adjustment damper 61 in advance.

Figure 3:
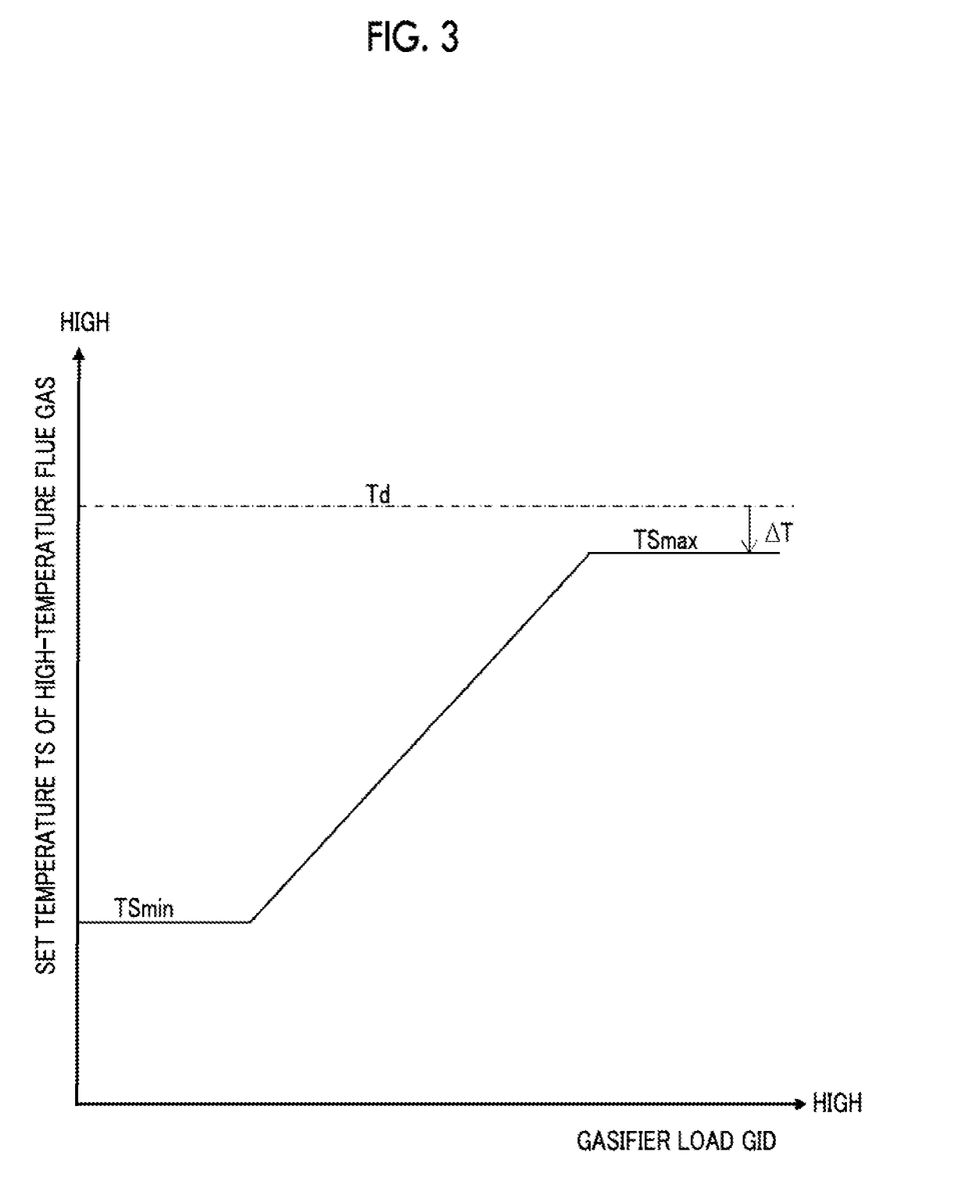
FIG. 3 is a schematic view illustrating a set function of a high-temperature flue gas temperature (a temperature of the high-temperature flue gas after adjustment of the temperature using an extreme high-temperature flue gas) according to the first embodiment of the present invention.

As illustrated in FIG. 3, a set temperature TS of the high-temperature flue gas 25H' is set to a higher temperature in a range between a minimum temperature TSmin and a maximum temperature TSmax as the gasifier load GID increases. This is because, as the gasifier load GID increases, the amount of the coal 19 (pulverized coal 20) consumed increases, and the amount of heat necessary to dry the coal 19 (pulverized coal 20) (hereinafter, referred to as the "necessary drying heat amount") increases. The maximum temperature TSmax is set to be lower than a set temperature Td of a high-temperature flue gas system (the set temperatures of the high-temperature flue gas ducts 31H and 31Ha or set temperatures of ancillary facilities such as the temperature sensor 60, a flow rate sensor 62, and a flow rate adjustment damper 63 that are installed in the high-temperature flue gas ducts 31H and 31Ha) by a margin $\Delta T$ (TSmax=Td$-\Delta T$) so as to prevent the temperature of the high-temperature flue gas 25H' from exceeding the set temperature Td.

In addition, the minimum temperature TS_min is set so that moisture included in the pulverized coal 20 can be dried to a prescribed amount at a partial load and the flow rates of flue gases flowing in the respective ducts 31H, 31Ha, and 31HH are in a range in which a variety of control devices (dampers and valves) can be operated.

Meanwhile, the flow rate of the high-temperature flue gas 25H' is controlled to be almost constant by the control of the flow rate adjustment damper 63 described below regardless of the gasifier load GID. That is, a change in the necessary drying heat amount in association with a change in the gasifier load GID (in association with a change in the amount of the pulverized coal) is dealt with by changing the temperatures of the high-temperature flue gas 25H' (and, furthermore, the drying gas 26).

In contrast, it can be also considered to change the flow rates of the high-temperature flue gas 25H' (and, furthermore, the drying gas 26) depending on the gasifier load GID by controlling the temperatures of the high-temperature flue gas 25H' (and, furthermore, the drying gas 26) to be almost constant regardless of the gasifier load GID. That is, it can be also considered to deal with the change in the necessary drying heat amount in association with the change in the gasifier load GID by changing the flow rates of the high-temperature flue gas 25H' (and, furthermore, the drying gas 26). In this case, when the gasifier load GID becomes a low load, the flow rate of the drying gas 26 is also decreased; however, at this time, the flow rate of the low-temperature flue gas 25L also decreases, and thus there is also a possibility that a tempering function of the low-temperature flue gas 25L becomes insufficient. Therefore, it is preferable to deal with the change in the necessary drying heat amount in association with the change in the gasifier load GID by changing the temperature of the high-temperature flue gas 25H' depending on the gasifier load GID while maintaining the flow rate of the drying gas 26 to be almost constant as described above.

In addition, in individual ducts 32 which connect the respective coal pulverizers 1 and the dust collector 2 and through which the pulverized coal 20 and the drying gas 26 are circulated, temperature sensors 66 are provided respectively. Detection signals from these temperature sensors 66 are respectively output to temperature adjustment dampers 65 provided in individual low-temperature flue gas ducts 31La, and the respective temperature adjustment dampers 65 change damper opening degrees on the basis of the detection signals. Therefore, the flow rate of the low-temperature flue gas 25L being mixed into the high-temperature flue gas 25H' is adjusted using the temperature adjustment damper 65 so that the temperature of the drying gas 26 (high-temperature flue gas 25H') decreases to a temperature at which there is no concern of ignition of the pulverized coal 20 without causing any hindrance to the drying of the pulverized coal 20.

Furthermore, in each of the high-temperature flue gas ducts 31Ha, the flow rate sensor 62 and the flow rate adjustment damper 63 are provided in this order from the upstream side, and, in each of the low-temperature flue gas ducts 31La, the flow rate sensor 64 is provided on the upstream side of the temperature adjustment damper 65. A detection signal from the flow rate sensor 62 and a detection signal from the flow rate sensor 64 are respectively output to the flow rate adjustment damper 63, and each flow rate adjustment damper 63 changes a damper opening degree according to these detection signals. Therefore, a total flow rate of the high-temperature flue gas 25H' flowing through the high-temperature flue gas duct 31Ha and the low-temperature flue gas 25L flowing through the low-temperature flue gas duct 31La, that is, flow rates of flue gases being supplied as the drying gas to the respective coal pulverizers 1 are adjusted to a prescribed flow rate using the respective flow rate adjustment dampers 63.

Meanwhile, in FIG. 1, the temperature sensors 60 and 66, the temperature adjustment dampers 61 and 65, the flow rate sensors 62 and 64, and the flow rate adjustment damper 63 are not illustrated.

As described above, the drying gas 26 dries the coal 19 (pulverized coal 20) in the coal pulverizer 1, then, is transported to the dust collector 2 together with the pulverized coal 20, is separated from the pulverized coal 20, and is then sent to the stack 95 of HRSG 9 through a duct 33.

[1-3. Action and Effect]

According to the first embodiment of the present invention, the high-temperature flue gas (high-temperature flue gas) 25H which has been denitration-treated using the in-furnace denitration device 93 and has a low NOx concentration (nitrogen oxide concentration), but is not yet heat-recovered using the downstream-side heat exchanger group 94 is bled from the bleed position 30H on the downstream side of the in-furnace denitration device 93 and on the upstream side of the downstream-side heat exchanger group 94 (high-temperature flue gas bleeding step).

In addition, the low-temperature flue gas (low-temperature flue gas) 25L which has been denitration-treated using the in-furnace denitration device 93, has a low NOx concentration, and has been heat-recovered using the downstream-side heat exchanger group 94 is bled from the bleed position 30L on the downstream side of the in-furnace denitration device 93 and the downstream heat exchanger group 94 (low-temperature flue gas bleeding step).

Furthermore, the high-temperature flue gas (extreme high-temperature flue gas) 25HH which is not yet heat-recovered using the heat exchanger groups 92 and 94 and has a higher temperature than the flue gas 25H is bled from the bleed position 30HH on the upstream side of the in-furnace denitration device 93 and the heat exchanger groups 92 and 94 (extreme high-temperature flue gas bleeding step).

In addition, using the temperature adjustment damper 61, the flow rate of the extreme high-temperature flue gas 25HH being supplied to the high-temperature flue gas 25H is controlled, and the temperature of the high-temperature flue gas 25H is adjusted to a prescribed temperature on a high temperature side (the high-temperature flue gas 25H becomes the high-temperature flue gas 25H' having a high temperature). Furthermore, using the temperature adjustment damper 65, the flow rate of the low-temperature flue gas 25L being supplied to the high-temperature flue gas 25H' is controlled, the temperature of the high-temperature flue gas 25H' is adjusted to a low temperature side, and the high-temperature flue gas 25H' becomes the drying gas 26 having a final temperature adjusted to a temperature at which the coal 19 (pulverized coal 20) does no ignite while being dried (mixing step).

In addition, this drying gas 26 is supplied to the coal pulverizer 1 and dries the coal 19 (pulverized coal 20).

Here, the denitration efficiency of the in-furnace denitration device 93 is maximized at a prescribed temperature (for example, approximately 350° C.; hereinafter, referred to as the maximum efficiency temperature). Therefore, in HRSG 9, the disposition of the in-furnace denitration device 93 or the heat transfer areas of the heat exchanger groups 92 and 94 are designed so that the temperature of the flue gas 25 flowing into the in-furnace denitration device 93 reaches the maximum efficiency temperature (also including a temperature near the maximum efficiency temperature, which shall apply below) Tef, and the operation conditions such as the evaporation amount are set. Therefore, from the bleed positions 30H and 30L on the downstream side of the in-furnace denitration device 93, only the flue gases 25H and 25L having the maximum efficiency temperature Tef or lower can be bled.

On the other hand, the bleed position 30HH is on the upstream side of the in-furnace denitration device 93 and the heat exchanger groups 92 and 94, and thus, from the bleed position 30HH, the flue gas 25HH having a higher temperature than the maximum efficiency temperature Tef can be bled. The temperature of the flue gas 25HH is, for example, approximately 550° C. at a nominal load, but differs with operation conditions and plants, and becomes lower than this temperature in the case of a partial load, and the temperature of the flue gas 25HH is not limited to approximately 550° C.

In addition, when the drying gas 26 is adjusted using the extreme high-temperature flue gas 25HH bled on the upstream side of the in-furnace denitration device 93 in addition to the low-temperature flue gas 25L and the high-temperature flue gas 25H bled respectively on the downstream side of the in-furnace denitration device 93, it is possible to increase the temperature of the drying gas 26 to a higher temperature compared with a case in which the drying gas 26 is adjusted using the low-temperature flue gas 25L and the high-temperature flue gas 25H as in the related art.

In addition, the drying gas 26 is used to dry the coal 19 (pulverized coal 20), then, mixed with the flue gases from HRSG 9 as described above, and discharged to the atmosphere as the flue gas 25e. Therefore, it is necessary to decrease the NOx concentration of the drying gas 26 so that the NOx concentration of the flue gas 25e reaches a target value (for example, a regulation value) or less. As a main component of the drying gas 26, the high-temperature flue gas 25H denitration-treated using the in-furnace denitration device 93 is used, and, as a flue gas for temperature adjustment that adjusts the temperature of the high-temperature flue gas 25H to a low temperature side, the low-temperature flue gas 25L denitration-treated using the in-furnace denitration device 93 is used.

Therefore, even when the extreme high-temperature flue gas 25HH that is not denitration-treated is used as a flue gas for temperature adjustment that adjusts the temperature of the high-temperature flue gas 25H to a high temperature side, it is possible to set the NOx concentration of the flue gas 25e to the target value or less by suppressing the NOx concentration of the drying gas 26 which is adjusted using the flue gases 25H, 25L, and 25HH. That is, a majority of the drying gas 26 is flue gases that have been denitration-treated (the high-temperature flue gas 25H and the low-temperature flue gas 25L), and thus, even when a part of the drying gas is the extreme high-temperature flue gas 25HH that is not denitration-treated, it is possible to set the flue gas 25e to the target value or less by suppressing the NOx concentration of the drying gas 26.

Meanwhile, in a case in which the drying gas 26 is directly discharged to the atmosphere without being mixed with the flue gases from HRSG 9, the mixing ratio between the flue gases 25H, 25L, and 25HH is adjusted so that the NOx concentration of the drying gas 26 reaches the target value (for example, the regulation value) or less.

Therefore, it becomes possible to use high-moisture coal which cannot be used in the related art as a fuel.

2. Second Embodiment

[2-1. Main Part Configuration]

A drying gas system which is a main part of an integrated coal gasification combined cycle according to a second embodiment of the present invention will be described with reference to FIG. 4. Meanwhile, the overall configuration of the integrated coal gasification combined cycle is the same as in the first embodiment (refer to FIG. 1), and the same configurational element as in the first embodiment will be given the same reference sign and will not be described again.

Figure 4:
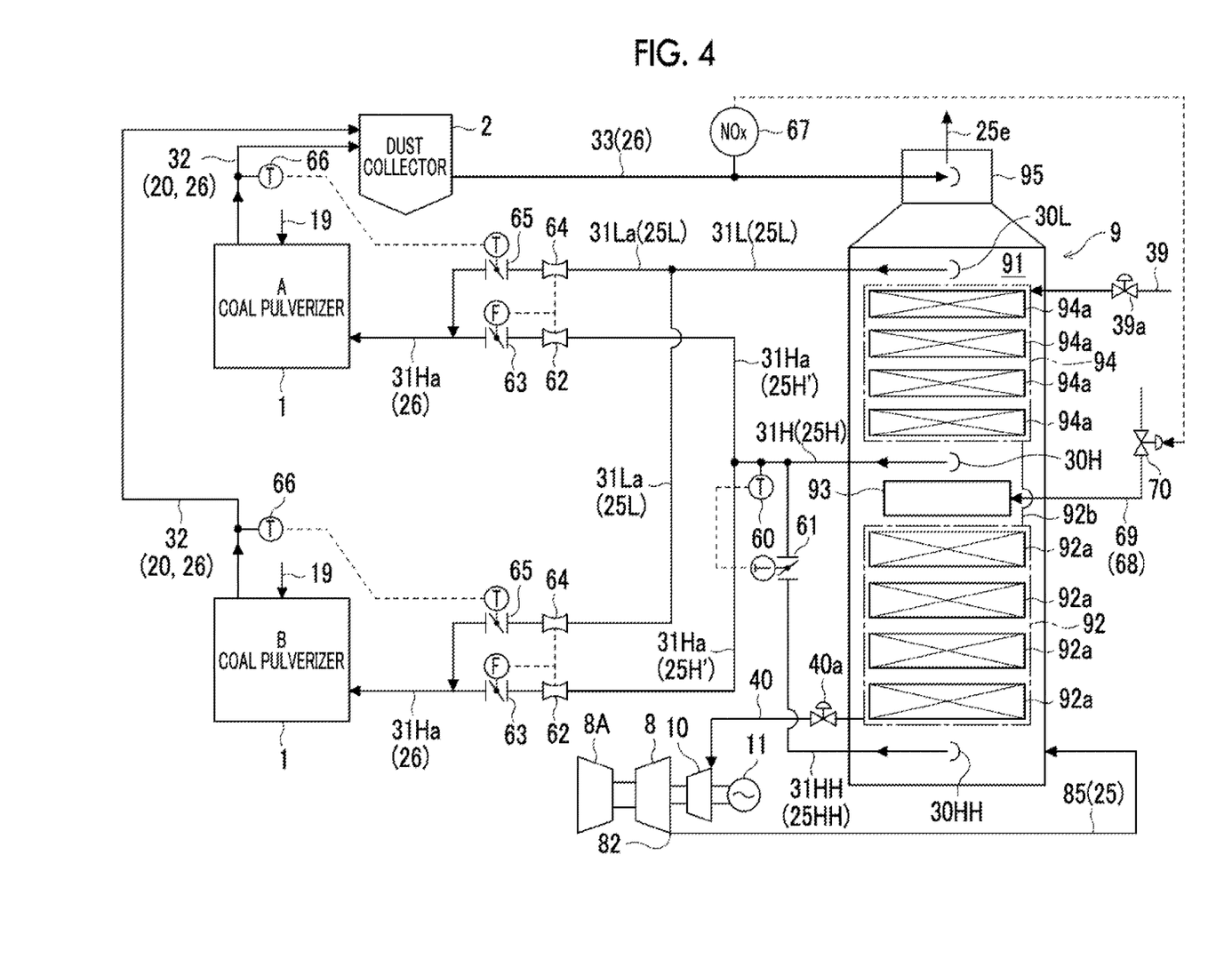
FIG. 4 is a schematic view illustrating a drying gas system of a coal (pulverized coal) according to a second embodiment of the present invention.

As illustrated in FIG. 4, in the present embodiment, a NOx sensor (nitrogen oxide concentration detection means) 67 is provided in the duct for discharging a drying gas (drying gas discharging line) 33 between the dust collector 2 and HRSG 9. The NOx sensor 67 detects the NOx concentration of the drying gas 26 being circulated in the duct 33.

Additionally, a flow rate adjustment valve (reducing agent supply amount adjustment means) 70 is interposed in a supply pipe 69 for supplying ammonia (reducing agent) 68 to the in-furnace denitration device 93.

A detection signal (signal indicating the NOx concentration) from the NOx sensor 67 is output to the flow rate adjustment valve 70. The flow rate adjustment valve 70 broadens the opening degree wider as the NOx concentration indicated by the detection signal from the NOx sensor 67 increases.

Therefore, as the NOx concentration of the drying gas 26 being circulated in the duct 33 increases, the amount of the ammonia being supplied to the in-furnace denitration device 93 from the supply pipe 69 increases.

Other configurations are the same in the first embodiment and will not be described.

[2-2. Action and Effect]

The drying gas 26 is used to dry the coal 19 (pulverized coal 20) in the coal pulverizer 1, then, mixed with the flue gases from HRSG, and discharged to the atmosphere as the flue gas 25e, and thus it is desirable to decrease the NOx concentration of the drying gas 26 to a possible low concentration.

Therefore, in the present embodiment, the amount of the ammonia being supplied to the in-furnace denitration device 93 is adjusted depending on the NOx concentration of the drying gas 26 (reducing agent supply amount adjustment step).

Therefore, the denitration performance of the in-furnace denitration device 93 improves, and thus the NOx concentrations of the high-temperature flue gas 25H and the low-temperature flue gas 25L are decreased, and furthermore, it becomes possible to decrease the NOx concentration of the drying gas 26 to a lower NOx concentration than in the first embodiment.

Meanwhile, in a case in which the drying gas 26 discharged from the dust collector 2 is supplied to the stack 95 of HRSG 9 and mixed with the flue gases from HRSG as in the present embodiment, the NOx sensor 67 may be provided in the stack 95 instead of the duct 33.

In addition, it is also possible to enable an operator in a main control room (not illustrated) to confirm the NOx concentration in the duct 33 or the stack on the basis of the detection signal from the NOx sensor 67 and enable the operator confirmed the NOx concentration to manually operate a flow rate adjustment valve operation portion in the main control room to control the opening degree of the flow rate adjustment valve 70. In this case, the reducing agent supply amount adjustment means of the present invention is configured of the flow rate adjustment valve 70 and the flow rate adjustment valve operation portion.

3. Third Embodiment

[3-1. Main Part Configuration]

A drying gas system which is a main part of an integrated coal gasification combined cycle according to a third embodiment of the present invention will be described with reference to FIG. 5. Meanwhile, the overall configuration of the integrated coal gasification combined cycle is the same as in the respective embodiments described above (refer to FIG. 1), and the same configurational element as in the respective embodiments described above will be given the same reference sign and will not be described again.

Figure 5:
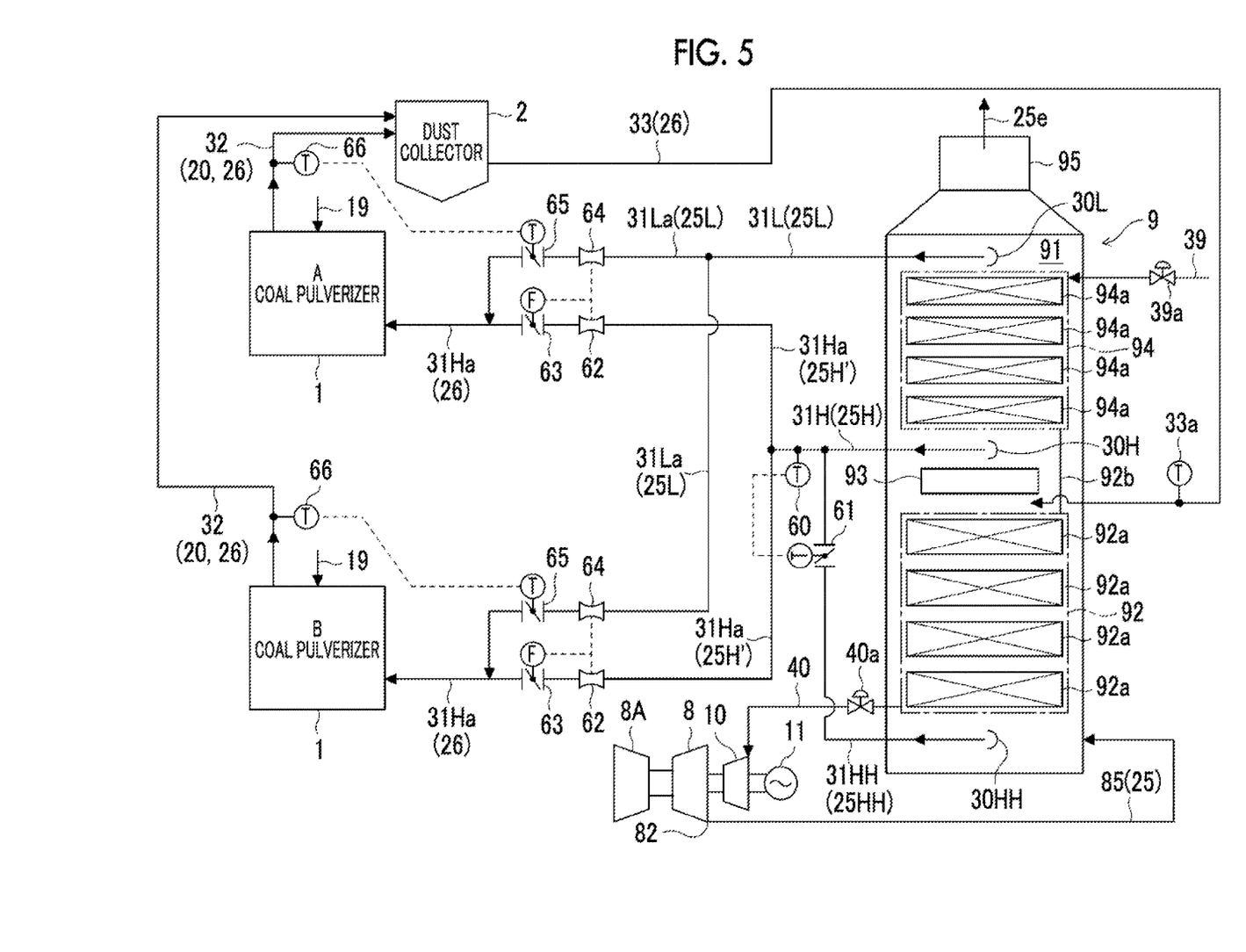
FIG. 5 is a schematic view illustrating a drying gas system of a coal (pulverized coal) according to a third embodiment of the present invention.

As illustrated in FIG. 5, in the present embodiment, the duct for discharging a drying gas (drying gas discharging line) 33 is connected to the furnace 91 of HRSG 9 on the upstream side of the in-furnace denitration device 93 in a communicated state. In the present embodiment, the duct 33 is connected to the furnace 91 immediately on the upstream side (in other words, between the in-furnace denitration device 93 and the upstream-side heat exchanger group 92) of the in-furnace denitration device 93, but the connection position of the duct 33 is not limited as long as the connection position is on the upstream side of the in-furnace denitration device 93. Therefore, the duct 33 may be connected to the furnace 91 at any position between any set of the upstream-side heat exchangers 92a or on the upstream side of the upstream-side heat exchanger group 92.

Other configurations are the same in the first embodiment and will not be described.

[3-2. Action and Effect]

In the configuration of the first embodiment (refer to FIG. 2), there are cases in which the NOx concentration of the drying gas 26 increases depending on the operation status and the like.

Specifically, in a case in which the coal 19 includes a large amount N, the NOx concentration of the extreme high-temperature flue gas 25HH being bled on the upstream side of the in-furnace denitration device 93 and, furthermore, the NOx concentration of the drying gas 26 including the extreme high-temperature flue gas 25HH increase. In addition, in a case in which the coal 19 includes a large amount of moisture or a case in which the gasifier load GID is high and the amount of the coal used is great, the amount of heat necessary to dry the coal 19 also increases. Therefore, it is necessary to increase the temperature of the drying gas 26, and thus the proportion of the extreme high-temperature flue gas 25HH (that is, the flue gas that is not denitration-treated using the in-furnace denitration device 93) in the drying gas 26 increases, which increases the NOx concentration of the drying gas 26.

Therefore, in the third embodiment of the present invention, the drying gas 26 is returned to the upstream side of the in-furnace denitration device 93 through the duct 33 (drying gas recirculation step).

Therefore, the drying gas 26 is denitration-treated using the in-furnace denitration device 93, and consequently, it is possible to decrease the NOx concentration of the flue gas 25e which includes the drying gas 26 and is discharged to the atmosphere to a target value or less.

Meanwhile, the drying gas 26 being returned to the upstream side of the in-furnace denitration device 93 through the duct 33 has a low temperature since the gas has been used to dry the coal 19 (pulverized coal 20). In a case in which the temperature of the drying gas 26 is expected to be significantly lower than the maximum efficiency temperature Tef of the in-furnace denitration device 93, it is possible to increase the temperature of the flue gas from an outlet of the upstream-side heat exchanger group 92 (that is, an inlet of the in-furnace denitration device 93) and approximate the temperature of the gas to the maximum efficiency temperature Tef by decreasing the amount of the steam from HRSG 9 and decreasing the amount of heat exchanged in the upstream-side heat exchanger group 92.

Specifically, a temperature sensor 33a is provided in the duct 33, a temperature Tg of the drying gas 26 which has been used to dry the coal 19 (pulverized coal 20) is detected using this temperature sensor 33a, and, in a case in which this temperature Tg is lower than a reference temperature Tb set on the basis of the maximum efficiency temperature Tef (Tb=Tef+α, α: margin temperature, α>0) (Tg<Tb), the amount of the steam from the HRSG 9 is decreased by decreasing the opening degree of at least one valve of the water supply valve 39a at an inlet of HRSG 9 and a steam valve 40a at an outlet of HRSG 9.

Alternatively, the significantly low temperature can be dealt with by designing the amount of heat received by the upstream-side heat exchanger group 92 in advance so that the temperature of the flue gas at the inlet of the in-furnace denitration device 93 reaches the maximum efficiency temperature Tef even after the drying gas 26 is returned to the upstream side of the in-furnace denitration device 93.

Therefore, it is possible to maintain the denitration performance of the in-furnace denitration device 93 in an optimal state.

Furthermore, it can be also considered to return the drying gas 26 to the furnace 91 on the upstream side of the position illustrated in FIG. 5, thereby suppressing the denitration performance of the in-furnace denitration device 93. That is, as the position at which the drying gas 26 is returned to the furnace 91 moves toward the upstream side, the drying gas 26 does not flow into the in-furnace denitration device 93 while remaining at a low temperature, is mixed with ambient high-temperature flue gases and heated by the ambient high-temperature flue gases so as to have an increased temperature, and thus flows into the in-furnace denitration device 93 after being heated. Therefore, it is possible to suppress the degradation of the denitration performance of the in-furnace denitration device 93.

4. Fourth Embodiment

[4-1. Main Part Configuration]

A drying gas system which is a main part of an integrated coal gasification combined cycle according to a fourth embodiment of the present invention will be described with reference to FIG. 6. Meanwhile, the overall configuration of the integrated coal gasification combined cycle is the same as in the respective embodiments described above (refer to FIG. 1), and the same configurational element as in the respective embodiments described above will be given the same reference sign and will not be described again.

Figure 6:
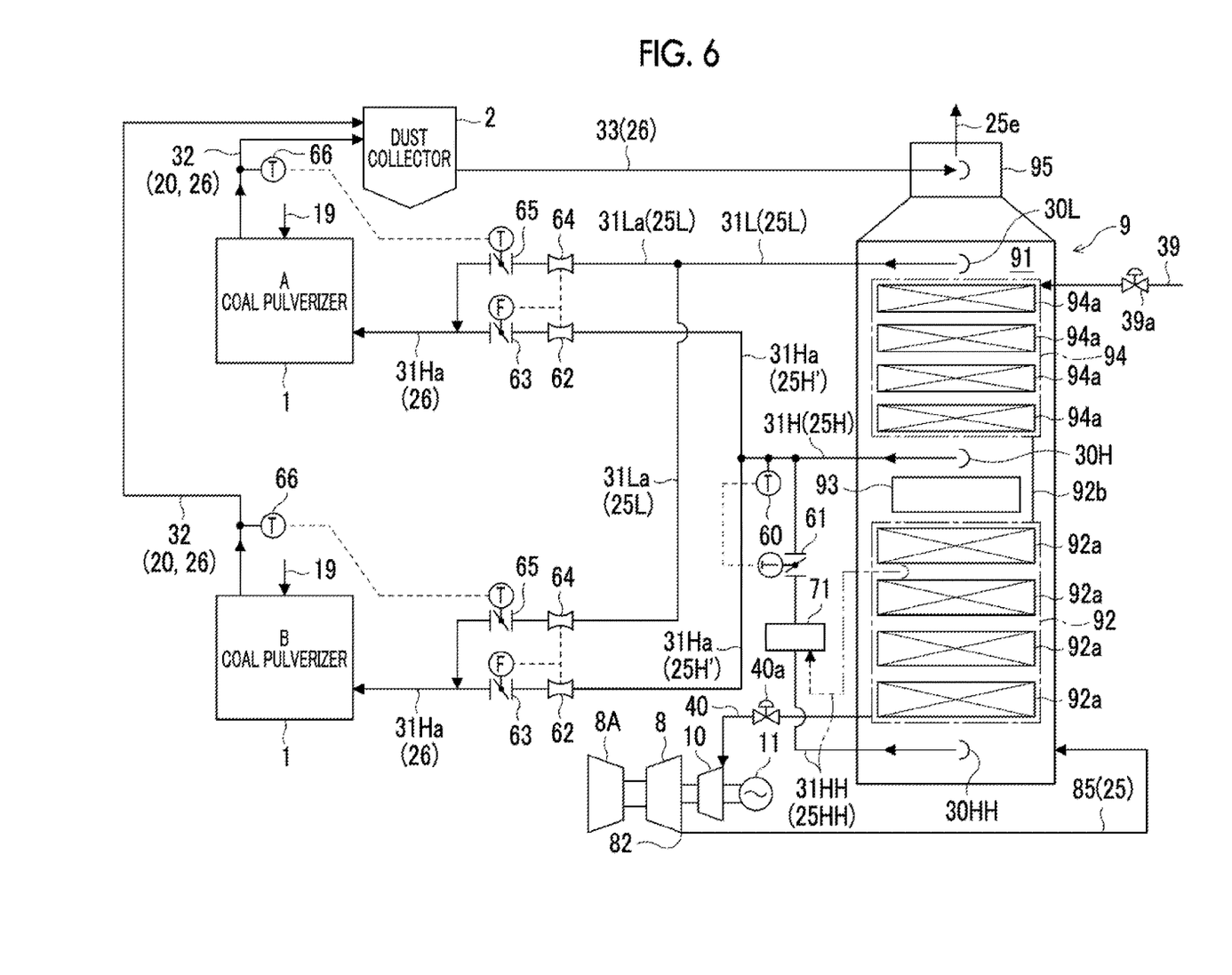
FIG. 6 is a schematic view illustrating a drying gas system of a coal (pulverized coal) according to a fourth embodiment of the present invention.

As illustrated in FIG. 6, in the present embodiment, an external denitration device 71 is interposed in the extreme high-temperature flue gas duct 31HH. As the external denitration device 71, a high-temperature denitration device which has heat resistance to the extreme high-temperature flue gas 25HH and has higher heat resistance and a higher denitration efficiency on the high temperature side (the maximum efficiency temperature Tef is on the high temperature side) than the in-furnace denitration device 93 so as to be capable of carrying out a denitration treatment at a high efficiency is employed.

Other configurations are the same in the first embodiment and will not be described.

[4-2. Action and Effect]

The drying gas 26 is mixed with the flue gases from HRSG 9 and discharged to the atmosphere as the flue gas 25e as described above. Therefore, it is necessary to suppress the NOx concentration of the drying gas 26 so that the NOx concentration of the flue gas 25e reaches a target value (for example, a regulation value) or less. According to the fourth embodiment of the present invention, the non-denitration-treated extreme high-temperature flue gas 25HH being bled from the upstream side of the in-furnace denitration device 93 is denitration-treated using the external denitration device 71 (extreme high-temperature flue gas denitration step).

Therefore, it is possible to set the NOx concentration of the flue gas 25e to the target value or less by suppressing the NOx concentration of the drying gas 26 which is adjusted using the extreme high-temperature flue gas 25HH. In addition, there is a tendency that a denitration device having a higher specification in terms of a treatment gas temperature becomes more expensive, but the external denitration device 71 has a smaller amount of a treatment gas and a small capacity than the in-furnace denitration device 93, and thus the present embodiment is capable of suppressing an increase in costs. Therefore, it is possible to decrease the NOx concentration of the flue gas 25e to the target value or less while suppressing an increase in costs.

[4-3. Others]

In the fourth embodiment, the extreme high-temperature flue gas 25HH is bled on the upstream side of the upstream-side heat exchanger group 92, and thus the temperature of the extreme high-temperature flue gas 25HH is high, and thus the high-temperature denitration device is used as the external denitration device 71. In contrast to the above-described configuration, for example, when the extreme high-temperature flue gas 25HH is bled from a set of two heat exchangers 92a on the downstream side of the upstream-side heat exchanger group 92 as illustrated by a two-dot chain line in FIG. 6, the extreme high-temperature flue gas 25HH has a lower temperature than in the above-described embodiment, and thus it becomes possible to use a denitration device having the same specification as the in-furnace denitration device 93 (capable of treating flue gases having substantially the same temperature) as the external denitration device 71. Therefore, it is possible to further suppress an increase in costs caused by the provision of the external denitration device 71.

In this case, the temperature of the extreme high-temperature flue gas 25HH becomes higher than the maximum efficiency temperature Tef of the external denitration device 71, and there is a possibility that the denitration efficiency may become lower than the maximum efficiency; however, although also depending on the NOx concentration of the extreme high-temperature flue gas 25HH, the external denitration device can be operated (the NOx concentration of the flue gas 25e being discharged to the atmosphere can be set to the target value or less) without any hindrance by increasing the amount of ammonia being injected into the external denitration device 71 or the like as long as the temperature of the extreme high-temperature flue gas 25HH does not exceed a heat resistance temperature of the external nitration device 71.

[5. Others]

(1) In the respective embodiments described above, the bleed position 30HH of the extreme high-temperature flue gas 25HH is set on the upstream side of the upstream-side heat exchanger group 92 in the furnace 91, but the bleed position 30HH of the extreme high-temperature flue gas 25HH is not limited thereto. The bleed position 30HH of the extreme high-temperature flue gas 25HH may be set (a) between a flue gas outlet 82 of the gas turbine 8 and the in-furnace denitration device 93 and (b) on the upstream side of the high-temperature bleed position 30H and set so as to sandwich at least a part of the upstream-side heat exchanger group 92 between the high-temperature bleed position 30H and the bleed position. Therefore, the extreme high-temperature flue gas 25HH may also be bled from a set of the upstream-side heat exchangers 92a and 92a by providing the bleed position 30HH between the set of the upstream-side heat exchangers. Alternatively, the extreme high-temperature flue gas may also be bled from a duct 85 between the flue gas outlet 82 of the gas turbine 8 and HRSG 9 by providing the bleed position 30HH in the duct 85.

Furthermore, the extreme high-temperature flue gas 25HH may also be bled from an interspace of a tube configuring the upstream-side heat exchanger 92a (hereinafter, referred to as the internal space) by providing the bleed position 30 in the internal space. In an ordinary heat exchanger, the internal space is too narrow to provide the bleed position 30HH (attach the extreme high-temperature flue gas duct 31HH in a communicated state), but it becomes possible to provide the bleed position 30HH by intentionally broadening a part of the internal space so that the bleed position 30HH can be provided.

Similarly, the bleed position 30H of the high-temperature flue gas 25H and the bleed position 30L of the low-temperature flue gas 25L are not limited to the positions of the above-described embodiments and may be provided between a set of the downstream-side heat exchangers 94a and 94a or in an internal space of the downstream-side heat exchanger 94a.

(2) In the respective embodiments described above, the extreme high-temperature flue gas 25HH is first mixed into the high-temperature flue gas 25H, and then the low-temperature flue gas 25L is mixed thereinto, but the low-temperature flue gas 25L may be first mixed into the high-temperature flue gas 25H, and then the extreme high-temperature flue gas 25HH may be mixed thereinto.

In addition, the extreme high-temperature flue gas 25HH may be mixed into the low-temperature flue gas 25L while adjusting the temperature by controlling the flow rate using the temperature adjustment damper 61, and a flue gas obtained by mixing the extreme high-temperature flue gas 25HH and the low-temperature flue gas 25L may be mixed into the high-temperature flue gas 25H. Alternatively, the extreme high-temperature flue gas 25HH may be respectively mixed into the low-temperature flue gas 25L and the high-temperature flue gas 25H while adjusting the temperature by controlling the flow rate using the temperature adjustment damper 61, and a mixed gas of the extreme high-temperature flue gas 25HH and the low-temperature flue gas 25L and a mixed gas of the extreme high-temperature flue gas 25HH and the high-temperature flue gas 25H may be mixed together.

(3) In the respective embodiments described above, a single generator 11 is driven using the gas turbine 8 and the steam turbine 10, but generators may be respectively and separately provided to the gas turbine 8 and the steam turbine 10.

(4) In the respective embodiments described above, two coal pulverizers 1 are provided, and the pulverized coal supply system of the gasifier 4 and the drying gas system incidental thereto configure two systems, but the number of the coal pulverizers 1 and the number of the pulverized coal supply systems and the drying gas systems are not limited thereto. For example, one coal pulverizer 1 may be provided, and the pulverized coal supply system and the drying gas system may configure one system or three coal pulverizers 1 may be provided, and the pulverized coal supply system and the drying gas system may configure three systems.

(5) In the respective embodiments described above, the carbonaceous feedstock gasification power generation facility of the present invention has been described as an air-blowing integrated coal gasification combined cycle, but the carbonaceous feedstock gasification power generation facility of the present invention can also be applied to an oxygen-blowing integrated coal gasification combined cycle.

(6) In the respective embodiments described above, the steam generated in HRSG 9 is supplied to the steam turbine 10 and used to generate power, and, at the same time, a part of the steam generated in HRSG 9 can also be used for other usages such as process steams in plants.

Alternatively, it is also possible to use the steam generated in HRSG 9 not for power generation but for other usages such as process steams in plants. In this case, the steam turbine 10 becomes unnecessary.

(7) In the respective embodiments described above, an example in which coal is used as the carbonaceous feedstock has been described, but the carbonaceous feedstock that can be used in the present invention is not limited to coal and may be, for example, biomass. As the biomass, plant-based biomass such as waste materials or timber for forest thinning can be exemplified, but the use of non-plant-based biomass is not excluded. In addition, plant pellets worked to a pellet shape are also considered as the biomass. In conclusion, the biomass is not limited by working forms.

(8) In the respective embodiments described above, an example in which the low-temperature flue gas duct 31L is connected to the high-temperature flue gas duct 31Ha has been described, but the high-temperature flue gas duct 31Ha and the low-temperature flue gas duct 31L may be respectively directly connected to the coal pulverizer 1. In this case, it is preferable to provide the respective connection positions of the low-temperature flue gas duct 31L and the high-temperature flue gas duct 31Ha to the coal pulverizer 1 close to each other so that the low-temperature flue gas and the high-temperature flue gas come into contact with the coal 19 or the pulverized coal in the coal pulverizer 1 after the high-temperature flue gas 25H and the low-temperature flue gas 25L are sufficiently mixed together and thus the temperature of the drying gas 26 becomes uniform. Alternatively, a mixer that mixing the high-temperature flue gas 25H and the low-temperature flue gas 25L is preferably provided in the coal pulverizer 1.

REFERENCE SIGNS LIST

1 COAL PULVERIZER (PULVERIZING DEVICE)
4 GASIFIER
8 GAS TURBINE
9 HEAT RECOVERY STEAM GENERATOR (HRSG)
10 STEAM TURBINE
11 GENERATOR
19 COAL (CARBONACEOUS FEEDSTOCK)
20 PULVERIZED COAL (PULVERIZED FUEL)

21 RAW SYNGAS CONTAINING CHAR 22
22 CHAR
23 RAW SYNGAS FROM WHICH CHAR 22 HAS BEEN SEPARATED
24 RAW SYNGAS (RAW SYNGAS AFTER PURIFICATION)
25 FLUE GAS FROM GAS TURBINE 8
25e FLUE GAS IN STACK 91
25H HIGH-TEMPERATURE FLUE GAS BLED FROM HEAT RECOVERY STEAM GENERATOR 9
25H' HIGH-TEMPERATURE FLUE GAS HAVING TEMPERATURE ADJUSTED TO INCREASE BY MIXING EXTREME HIGH-TEMPERATURE FLUE GAS 25HH INTO HIGH-TEMPERATURE FLUE GAS 25H
25HH EXTREME HIGH-TEMPERATURE FLUE GAS BLED FROM HEAT RECOVERY STEAM GENERATOR 9
25L LOW-TEMPERATURE FLUE GAS BLED FROM HEAT RECOVERY STEAM GENERATOR 9
26 DRYING GAS
30H BLEED POSITION OF HIGH-TEMPERATURE FLUE GAS BLED FROM HEAT RECOVERY STEAM GENERATOR 9 (HIGH-TEMPERATURE BLEED POSITION)
30HH BLEED POSITION OF EXTREME HIGH-TEMPERATURE FLUE GAS BLED FROM HEAT RECOVERY STEAM GENERATOR 9 (EXTREME HIGH-TEMPERATURE BLEED POSITION)
30L, 31La BLEED POSITION OF LOW-TEMPERATURE FLUE GAS BLED FROM HEAT RECOVERY STEAM GENERATOR 9 (LOW-TEMPERATURE BLEED POSITION)
31H, 31Ha HIGH-TEMPERATURE FLUE GAS DUCT (HIGH-TEMPERATURE FLUE GAS LINE)
31HH EXTREME HIGH-TEMPERATURE FLUE GAS DUCT (EXTREME HIGH-TEMPERATURE FLUE GAS LINE)
31L LOW-TEMPERATURE FLUE GAS DUCT (LOW-TEMPERATURE FLUE GAS LINE)
33 DUCT FOR DISCHARGING DRYING GAS (DRYING GAS DISCHARGING LINE)
39 WATER SUPPLY
39a WATER SUPPLY VALVE
40 STEAM
40a STEAM VALVE
33a, 60, 66 TEMPERATURE SENSOR
61 TEMPERATURE ADJUSTMENT DAMPER (TEMPERATURE ADJUSTMENT MEANS)
62, 64 FLOW RATE SENSOR
63 FLOW RATE ADJUSTMENT DAMPER
65 TEMPERATURE ADJUSTMENT DAMPER
67 NOx SENSOR (NITROGEN OXIDE CONCENTRATION DETECTION MEANS)
68 AMMONIA (REDUCING AGENT)
69 SUPPLY PIPE OF AMMONIA 68
70 FLOW RATE ADJUSTMENT VALVE (REDUCING AGENT SUPPLY AMOUNT ADJUSTMENT MEANS)
71 EXTERNAL DENITRATION DEVICE
82 FLUE GAS OUTLET OF GAS TURBINE 8
91 FURNACE OF HEAT RECOVERY STEAM GENERATOR 9
92 UPSTREAM-SIDE HEAT EXCHANGER GROUP OF HEAT RECOVERY STEAM GENERATOR 9 (UPSTREAM-SIDE HEAT EXCHANGER PORTION)
92a HEAT EXCHANGER CONFIGURING UPSTREAM-SIDE HEAT EXCHANGER GROUP 92
93 IN-FURNACE DENITRATION DEVICE OF HEAT RECOVERY STEAM GENERATOR 9
94 DOWNSTREAM-SIDE HEAT EXCHANGER GROUP OF HEAT RECOVERY STEAM GENERATOR 9 (DOWNSTREAM-SIDE HEAT EXCHANGER PORTION)
94a HEAT EXCHANGER CONFIGURING DOWNSTREAM-SIDE HEAT EXCHANGER GROUP 94
95 STACK OF HEAT RECOVERY STEAM GENERATOR 9
100 INTEGRATED COAL GASIFICATION COMBINED CYCLE (IGCC SYSTEM, CARBONACEOUS FEEDSTOCK GASIFICATION POWER GENERATION FACILITY)
Tef MAXIMUM EFFICIENCY TEMPERATURE OF IN-FURNACE DENITRATION DEVICE
TS SET TEMPERATURE OF HIGH-TEMPERATURE FLUE GAS 25H'
TS_max MAXIMUM TEMPERATURE OF SET TEMPERATURE TS
TS_min MINIMUM TEMPERATURE OF SET TEMPERATURE TS
Td SET TEMPERATURE OF HIGH-TEMPERATURE FLUE GAS SYSTEM
ΔT MARGIN FOR DETERMINING SET TEMPERATURE TS

The invention claimed is:

1. A carbonaceous feedstock gasification power generation facility, comprising:
a pulverizing device that pulverizes a carbonaceous feedstock to produce a pulverized fuel;
a gasifier that gasifies the pulverized fuel to generate a raw syngas;
a gas turbine that is driven by a combustion gas obtained by combusting the raw syngas;
a generator that is connected to the gas turbine and driven by the gas turbine;
a heat recovery steam generator that introduces an exhaust gas being discharged from the gas turbine, is provided with an upstream-side heat exchange portion made up of one or more heat exchangers, an in-furnace denitration device which is a denitration device provided in the gasifier, and a downstream-side heat exchange portion made up of one or more heat exchangers in a furnace in this order from an exhaust gas upstream side, and generates a steam by recovering heat from the exhaust gas in the upstream-side heat exchange portion and the downstream-side heat exchange portion;
a high-temperature exhaust gas line that bleeds a high-temperature exhaust gas from the furnace at a high-temperature bleed position which is set on an exhaust gas downstream side of the in-furnace denitration device and supplies the high-temperature exhaust gas to the pulverizing device as a drying gas the carbonaceous feedstock, the high-temperature exhaust gas which is bled from a bleed position which is set on the downstream side of the upstream-side heat exchange portion and the in-furnace denitration device and the upstream side of the downstream-side heat exchange portion;
a low-temperature exhaust gas line that bleeds a low-temperature exhaust gas from the furnace at a low-temperature bleed position which is set on the exhaust gas downstream side of the high-temperature bleed position and set so as to sandwich at least a part of the downstream-side heat exchange portion between the high-temperature bleed position and the low-temperature bleed position and supplies the low-temperature exhaust gas to the high-temperature exhaust gas line or directly to the pulverizing device, the low-temperature exhaust gas is bled from a bleed position which is set on the downstream side of the downstream-side heat exchange portion;

an extreme high-temperature exhaust gas line that bleeds an extreme high-temperature exhaust gas from the furnace at an extreme high-temperature bleed position which is set on an exhaust gas upstream side of the high-temperature bleed position between an exhaust gas outlet of the gas turbine and the in-furnace denitration device which is a denitration device provided in the gasifier and set so as to sandwich at least a part of the upstream-side heat exchange portion between the high-temperature bleed position and the extreme high-temperature bleed position and supplies the extreme high-temperature exhaust gas to at least one exhaust gas line of the high-temperature exhaust gas line and the low-temperature exhaust gas line, the extreme high-temperature exhaust gas is bled from a bleed position which is set on the upstream side of the upstream-side heat exchange portion; and temperature adjustment damper that is interposed in the extreme high-temperature exhaust gas line and adjusts a flow rate of the extreme high-temperature exhaust gas being supplied to the at least one exhaust gas line so that a gas temperature in the at least one exhaust gas line reaches a prescribed temperature.

2. The carbonaceous feedstock gasification power generation facility according to claim 1, further comprising:

a drying gas discharging line that discharges the drying gas used to dry the carbonaceous feedstock from the pulverizing device;

a $NO_x$ sensor that detects a nitrogen oxide concentration of the drying gas in the drying gas discharging line; and a flow rate adjustment valve that adjusts a supply amount of a reducing agent being supplied to the in-furnace denitration device according to a detection signal from the nitrogen oxide concentration detection means.

3. The carbonaceous feedstock gasification power generation facility according to claim 1, further comprising:

a drying gas discharging line that discharges the drying gas used to dry the carbonaceous feedstock from the pulverizing device, wherein the drying gas discharging line is connected to the furnace on the exhaust gas upstream side of the in-furnace denitration device.

4. The carbonaceous feedstock gasification power generation facility according to claim 3, further comprising:

a temperature adjustment damper in the drying gas discharging line, wherein, in a case in which a temperature of the drying gas detected using the temperature detection means is lower than a reference temperature set on the basis of a maximum efficiency temperature of the in-furnace denitration device, the maximum efficiency temperature is the temperature at which the denitration efficiency of the denitration device is maximized, an opening degree of at least one of a water supply valve that controls an amount of water being supplied to the heat recovery steam generator and a steam valve that controls an amount of a steam from the heat recovery steam generator is decreased.

5. The carbonaceous feedstock gasification power generation facility according to claim 1, further comprising:

an external denitration device which is a denitration device provided outside the gasifier, in the extreme high-temperature exhaust gas line.

6. A method for adjusting a drying gas being used to dry a carbonaceous feedstock in a carbonaceous feedstock gasification power generation facility including a gasifier that gasifies a carbonaceous feedstock to generate a raw syngas, a gas turbine that is driven by a gas for combustion obtained by combusting the raw syngas, a generator that is connected to the gas turbine and driven by the gas turbine, and a heat recovery steam generator that generates a steam by recovering heat from an exhaust gas in being discharged from the gas turbine, in which the heat recovery steam generator is provided with an upstream-side heat exchange portion made up of one or more heat exchangers, an in-furnace denitration device which is a denitration device provided in the gasifier, and a downstream-side heat exchange portion made up of one or more heat exchangers in a furnace in this order from an upstream side in a circulation direction of the exhaust gas, the method comprising:

bleeding a high-temperature exhaust gas from the furnace at a high-temperature bleed position which is set on a downstream side of the in-furnace denitration device in the circulation direction, the high-temperature exhaust gas which is bled from a bleed position which is set on the downstream side of the upstream-side heat exchange portion and the in-furnace denitration device and the upstream side of the downstream-side heat exchange portion;

bleeding a low-temperature exhaust gas from the furnace at a low-temperature bleed position which is set on the downstream side of the in-furnace denitration device and the high-temperature bleed position in the circulation direction and set so as to sandwich at least a part of the downstream-side heat exchange portion between the high-temperature bleed position and the low-temperature bleed position, the low-temperature exhaust gas is bled from a bleed position which is set on the downstream side of the downstream-side heat exchange portion;

bleeding an extreme high-temperature exhaust gas from the furnace at an extreme high-temperature bleed position which is set on an exhaust gas upstream side of the high-temperature bleed position between an outlet of the exhaust gas from the gas turbine and the in-furnace denitration device and set so as to sandwich at least a part of the upstream-side heat exchange portion between the high-temperature bleed position and the extreme high-temperature bleed position, the extreme high-temperature exhaust gas is bled from a bleed position which is set on the upstream side of the upstream-side heat exchange portion; and mixing the low-temperature exhaust gas and the extreme high-temperature exhaust gas into the high-temperature exhaust gas, wherein, in the mixing, a flow rate of the extreme high-temperature exhaust gas being supplied to at least one exhaust gas is adjusted so that a gas temperature in the at least one exhaust gas of the high-temperature exhaust gas and the low-temperature exhaust gas reaches a prescribed temperature.

7. The method for adjusting a drying gas a carbonaceous feedstock according to claim 6, further comprising:

adjusting an amount of a reducing agent being supplied to the in-furnace denitration device according to a nitrogen oxide concentration of the drying gas used to dry the carbonaceous feedstock.

8. The method for adjusting a drying gas a carbonaceous feedstock according to claim 6, further comprising:

returning the drying gas used to dry the carbonaceous feedstock to the furnace on the exhaust gas upstream side of the in-furnace denitration device.

9. The method for adjusting a drying gas a carbonaceous feedstock according to claim 8, wherein, in a case in which a temperature of the drying gas used to dry the carbonaceous feedstock is lower than a reference temperature set on the basis of a maximum efficiency temperature of the in-furnace denitration device, the maximum efficiency temperature is the temperature at which the denitration efficiency of the denitration device is maximized, at least any one of an amount of water being supplied to the heat recovery steam generator and an amount of a steam from the heat recovery steam generator is decreased.

10. The method for adjusting a drying gas a carbonaceous feedstock according to claim 6, further comprising:

denitration-treating the extreme high-temperature exhaust gas.

\* \* \* \* \*